3,442,126
MAGNETIC COUPLING
Kenneth Southall, Wethersfield, Conn., assignor to Neptune Meter Company, New York, N.Y., a corporation of New Jersey
Filed Apr. 5, 1967, Ser. No. 628,704
Int. Cl. G01f 3/08
U.S. Cl. 73—257                                    17 Claims

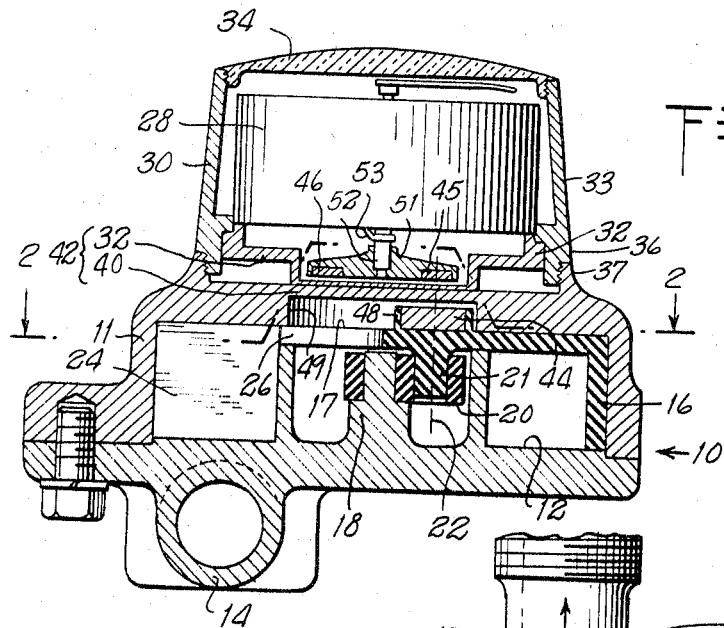
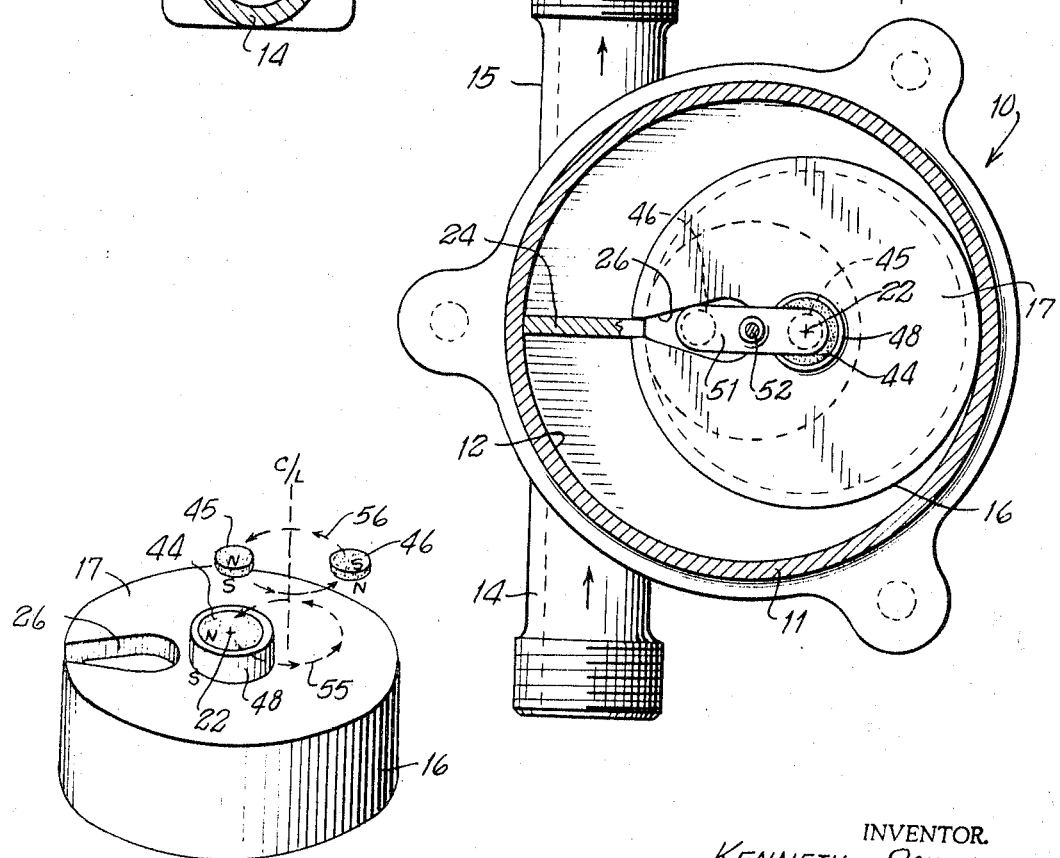

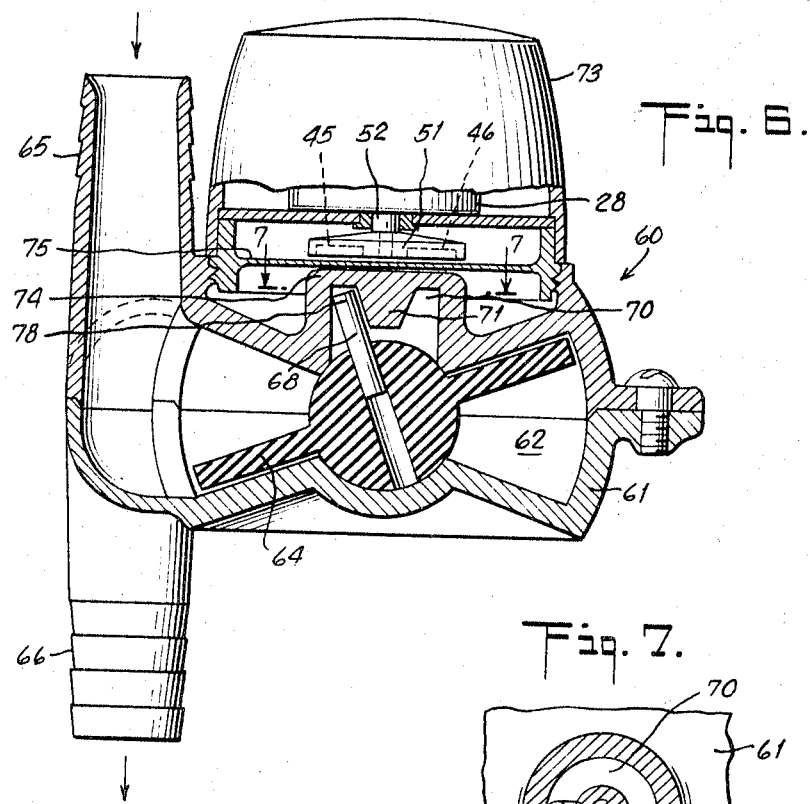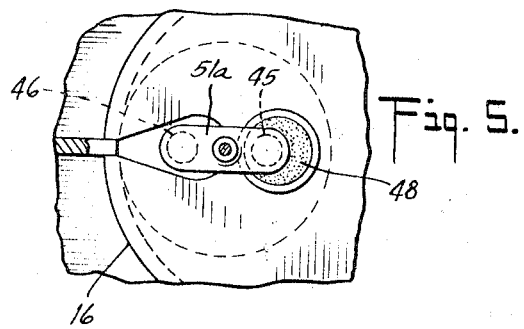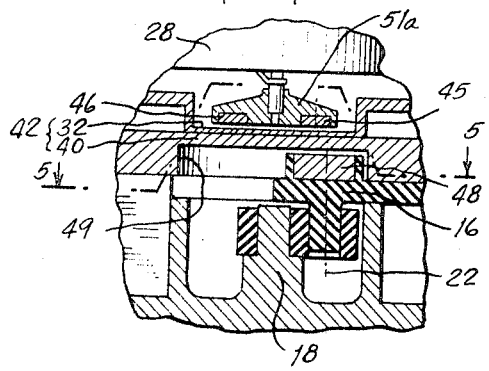

ABSTRACT OF THE DISCLOSURE

A magnetic coupling for a positive displacement fluid meter, having a driver magnet carried by the meter piston about an annular path and a pair of follower magnets carried by a rigid rotatable mounting for revolution 180° apart in an annular path which is coaxial with the path of the driver magnet and is equal in radius to, or smaller in radius than, the driver magnet path. Rotation of the follower magnet mounting operates a meter indicator mechanism. The driver and follower magnets are disposed on opposite sides of a wall separating the meter flow chamber from the indicator housing, being coupled only magnetically through this wall. Each of the magnets has one polarized end facing the wall; the wall-facing ends of the two follower magnets are opposite to each other in polarity. The two follower magnets are substantially equal in mass and also are substantially smaller than the driver magnet.

Background of the invention

This invention relates to magnetic coupling devices for transmitting angular motion of a driving element, usually through a solid wall, to a driven element. Such magnetic couplings are commonly used in positive displacement fluid flow meters for transmitting motion of a meter piston to an indicator mechanism.

Various types of positive displacement fluid meters are known wherein the fluid to be metered is conducted through a flow chamber to effect cyclical motion of a piston disposed within the chamber. The piston is so arranged that a portion thereof undergoes angular displacement at a rate of one complete revolution per unit quantity of fluid passing through the meter. An indicator mechanism driven by the piston counts these revolutions to register cumulative quantity of fluid flow. The motion of the piston, or at least the output portion thereof, is commonly eccentric with respect to the axis of the flow chamber, and with respect to the input shaft of the indicator mechanism. It is to be understood that the term "eccentric" as herein employed designates annular motion of a point about an axis that is displaced with respect to the point, and includes annular motion of a body, element or structural portion of finite extent about an axis that is displaced wtih respect to the geometric axis of the body, element or structural portion.

The indicator mechanism must ordinarily be isolated from the flow chamber to prevent damage to the mechanism by exposure to water or other fluid in the meter, and is preferably contained within a sealed housing. This requirement presents difficulties in the design of direct mechanical connections between the meter piston and the indicator. Accordingly, in place of such direct mechanical connection, a magnetic coupling device is sometimes employed to transmit the piston motion to the indicator through a completely sealed wall separating the indicator mechanism from the flow chamber.

One form of such magnetic coupling is described in U.S. patent to Coger No. 2,399,856, which shows a pair of substantially identical elongated bar magnets coupled in spaced end-to-end relation. The driver magnet is carried by a meter piston for movement therewith in a path eccentric with respect to the axis of the chamber in which the piston moves. The follower magnet is mounted eccentrically in a rotor (which drives the indicator mechanism) for motion in an annular path coaxial with the first magnet path. The two magnets are magnetically coupled through a sealed wall which separates the meter chamber from the indicator.

A problem heretofore encountered in magnetic couplings utilizing magnets mounted for eccentric movement is that slippage or loss of coupling between the driver and follower magnets tends to occur upon acceleration or deceleration of the meter piston. Accordingly, it has been preferred to use a magnetic coupling having a first rotatable magnet disposed on the flow chamber side of the sealed wall and driven mechanically by the meter piston, and a second rotatable magnet disposed externally of the wall in coupled relation to the first magnet and operatively connected to the indicator mechanism. The magnets may be positioned in coaxial end-to-end (axial) or concentric (radial) spaced relation with appropriately arranged poles; but in either case their motions are both concentric rather than eccentric—that is, their geometric axes and axes of rotation coincide—since concentric magnet motion has heretofore been considered preferable to assure maintained coupling without slippage. It has therefore been necessary to provide a mounting rotatably supporting the driver magnet independently of the piston, with mechanical linkage between the piston and the driver magnet for converting eccentric motion of the piston to concentric motion of the driver magnet.

Summary of the invention

The present invention broadly contemplates the combination, with a driven element and a driving element having at least a portion moving in an annular eccentric path, of a first, driver magnet engaged or carried by the latter driving element portion for movement therewith along the annular path, and a pair of follower magnets carried by a rigid rotatable mounting (which is connected to operate the driven element) for movement 180° apart along an annular path which is coaxial with and substantially equal in radius to, or smaller in radius than, the annular path of the driver magnet. The driver and follower magnets may be end-polarized permanent magnets having substantially rectilinear magnetic axes, and are conveniently flat disc-shaped magnets having poles located at the opposed disc faces. In the present coupling device, one polarized end of the driver magnet faces away from the driving element for movement in a given plane of revolution, and one polarized end of each of the follower magnets faces this plane of revolution, these ends of the follower magnets being spaced from the latter plane at a distance selected to afford magnetic coupling between the driver and follower magnets; as will therefore be understood, the coupling of the invention is axial in arrangement, since the driver and follower magnets are disposed in end-to-end relation spaced apart along their common axis of revolution, notwithstanding that they are positioned eccentrically of such axis and may also to some extent be spaced apart radially as when the radius of the follower magnet path is shorter than the radius of the driver magnet path.

Very preferably the last-mentioned ends of the two follower magnets are opposite to each other in polarity so that one of the followers is attracted to, and the other repelled by, the driver magnet. The follower magnet which is attracted to the driver magnet is ordinarily aligned therewith in directly facing relation as the magnets move along their respective paths. Acceleration or deceleration of the driving element may cause the driver magnet to lead or lag behind this attracted follower magnet, although the attractive force between the driver magnet and attracted follower magnet tends to produce coresponding acceleration or deceleration of the rotatable follower mounting; but if the driver magnet becomes displaced by as much as 90° with respect to the attracted follower magnet, it enters the repelling field of the other follower magnet and hence continues to effect acceleration or deceleration of the follower magnet mounting, i.e. by repulsion of the repelled follower magnet. In this way, slippage between the driver and follower magnets is effectively prevented during driving element acceleration and deceleration, yet the coupling transmits the eccentric driving motion without prior conversion to concentric magnet motion and thereby eliminates the need for rotatably mounting the driver magnet independently of the driving element and for providing linkage between the driving element and driver magnet to effect such conversion.

It is also preferred that the two follower magnets be substantially equal to each other in mass so that their revolution exerts no net centrifugal force on the mounting on which they are carried, and (for optimum coupling between the driver and follower magnets during acceleration or deceleration of the driving element) it is preferred that the follower magnet path radius be slightly shorter than the driver magnet path radius. Further, it is preferred that each of the follower magnets be substantially smaller than the driver magnet. Whereas the driver magnet is desirably made relatively large to provide good coupling strength, the smaller size of the follower magnets advantageously minimizes inertial forces and thrust and bearing loads on the driven element. In some instances, with a driver magnet substantially larger than the follower magnet, adequate avoidance of slippage may be achieved even if one of the followers is omitted; in such case it is found to be preferable (for avoiding slippage) that the end of the single follower magnet facing the plane of driver magnet revolution be of the same polarity as the facing end of the driver magnet so that the forces between the magnets are repulsive rather than attractive.

The magnetic couplings of the invention are particularly adapted for use in positive displacement fluid meters such as meters of the cylindrical piston or nutating-disc piston types. For such use, the driver magnet is directly engaged or carried by an eccentrically moving portion of the piston on one side of the sealed wall separating the meter indicator mechanism from the flow chamber. The follower magnets are disposed on the opposite side of the wall in facing relation thereto and are mechanically connected through their common mounting to operate the indicator mechanism.

Further features and advantages of the invention will be apparent from the detailed description hereinbelow set forth, together with the accompanying drawings.

Brief description of the drawings

FIG. 1 is a sectional elevational view of a cylindrical piston-type positive displacement water meter incorporating the magnetic coupling device of the present invention in an illustrative embodiment;

FIG. 2 is a simplified plan view taken as along the line 2—2 of FIG. 1, with housing structure portions omitted to show the relative positions of the magnets in the coupling of FIG. 1;

FIG. 3 is a simplified and somewhat schematic perspective view of the piston and coupling magnets of the meter of FIGS. 1 and 2, illustrating the paths of movement of these elements;

FIG. 4 is a fragmentary sectional elevational view of a modified form of the coupling of FIG. 1, wherein the radius of the follower magnet path is slightly shorter than the radius of the driver magnet path;

FIG. 5 is a fragmentary plan view, taken along the line 5—5 of FIG. 4, with housing structure portions omitted to show the relative positions of the magnets in the coupling of FIG. 4;

FIG. 6 is a sectional elevational view of a nutating disc piston-type positive displacement water meter incorporating an embodiment of the invention; and FIG. 7 is a detail view taken along the line 7—7 of FIG. 6.

Detailed description

Referring first to FIGS. 1–3, the embodiment of the invention there shown is incorporated in a cylindrical piston-type positive displacement water meter 10 having a housing 11 defining an axially vertical confined cylindrical meter chamber 12 through which the water to be metered flows. Axially aligned inlet and outlet fittings 14 and 15 are formed integrally with the housing 11 for connection of the meter in a water pipe or conduit line.

Disposed within the chamber 12 is an axially vertical cylindrical piston 16 having the form of an inverted cup with a plane circular upper surface 17. Piston 16 conforms closely in vertical extent to the chamber 12 but is substantially smaller in diameter than the chamber and is cyclically movable therein in a horizontal plane. To guide this cyclical movement of the piston, a fixed arbor 18 projecting upwardly from the center of the floor of chamber 12 is connected by an eccentric bearing 20 to a pivot post 21 carried by and projecting downwardly from the center of the upper surface 17 of the piston. Bearing 20 is adapted and arranged to permit the piston to move within the chamber in such manner that the centerpoint 22 of the piston upper surface undergoes eccentric motion, describing an axially vertical annular path about arbor 18.

The flow of water to be metered passes through the chamber between inlet and outlet orifices (not shown) in the chamber floor, disposed on opposite sides of a fixed vertical divider plate 24 which extends radially through the chamber on one side thereof and is received in slot 26 formed on one side of the piston 16. The slot 26 is shaped to permit the aforementioned cyclical movement of the piston with maintained engagement of at least an edge portion of the piston with the divider plate 24. It will be understood that the arrangement of the chamber, piston, inlet and outlet orifices and plate 24 may be entirely conventional, these elements cooperating in such manner that the piston 16 undergoes cyclical motion incident to flow of water through the meter chamber at a rate of one complete cycle of revolution of the piston centerpoint 22 for each given unit quantity of water passing through the chamber. The details of such arrangement will be readily apparent to those skilled in the art and accordingly need not be further described.

The meter structure shown also includes an indicator mechanism 28, which again may be wholly conventional (and hence is not illustrated in detail), comprising, for example, a counter device for counting and registering the revolutions of the meter piston 16 as a measure of cumulative quantity of water passing through the meter. For protection, this mechanism is enclosed within a housing 30 including a base plate 32, a housing body 33 seating on the base plate, and a transparent face plate 34 threaded in the upper end of the body 33. The indicator housing 30 is mounted directly above the flow chamber 12 on the meter housing 11, for example by threaded engagement of a shoulder portion 36 of housing body 33 with an annular flange 37 on the meter housing.

The flow chamber is separated from the indicator mechanism by an upper portion 40 of the meter housing and by the base plate 32 which rests on the latter housing portion. Plate 32 and housing portion 40 together constitute a wall 42 extending between the flow chamber and the indicator mechanism in parallel relation to the plane of revolution of piston centerpoint 22, and completely sealing off the indicator mechanism from the liquid in the flow chamber, there being no apertures or openings through this wall. The piston 16 is coupled to the indicator mechanism through the wall by the magnetic coupling device of the invention, now to be described, and accordingly the materials constituting the wall 42 should be nonmagnetic, i.e. of such character as not to interfere with magnetic coupling therethrough.

As incorporated in the above-described meter structure, the magnetic coupling device of the invention includes a first disc-shaped permanent magnet 44 carried by piston 16, and second and third disc-shaped permanent magnets 45 and 46 disposed within the indicator housing 30. Each of these magnets is a bar magnet having a rectilinear magnetic axis and oppositely polarized flat end faces. The first magnet is the driver magnet, and the second and third magnets are the follower magnets, of the device.

Specifically, the driver magnet 44 is mounted in the center of the upper surface 17 of the piston 16, with its magnetic axis coincident with the vertical axis of symmetry of the piston, and with one polarized end surface facing away from the piston, i.e. toward wall 42; as shown, this magnet is received within and held in place by a cup structure 48 formed integrally with and projecting upwardly from the piston upper surface. Thus, as the piston undergoes cyclical motion, the magnet 44 moves therewith along the annular path of the piston centerpoint 22, being disposed eccentrically with respect to the vertical axis of that annular path. The polarized upper end face of magnet 44 moves in a horizontal plane of revolution, parallel to the wall 42. As further shown in FIG. 1, the magnet 44 projects above the piston 16 and into a recess 49 formed in the meter housing portion 40 and shaped to accommodate the annular motion of the magnet.

The two follower magnets 45 and 46 within the indicator housing 30 are fixedly mounted in axially parallel relation at opposite ends of a straight, rigid, horizontally extending arm 51 so dimensioned that the distance between the magnetic axes of these two magnets is substantially equal to the diameter of the annular path of magnet 44. Arm 51 is secured at its midpoint to the lower extremity of a vertical pinion shaft 52 which is supported as by bearing 53 for rotation about its axis, and connected to the indicator mechanism 28 to drive the aforementioned counter device. The axis of shaft 52 is coincident with the axis of the annular path of magnet 44, and this arm 51, extending transversely of the shaft axis, is thus positioned for rotation in a horizontal plane. Each of the follower magnets has one downwardly-facing polarized end surface lying in the latter plane.

In this arrangement of elements, the two follower magnets 45 and 46 are supported by arm 51 for revolution 180° apart in an annular path coaxial with and substantially equal in radius to the annular path of the driver magnet 44. The plane of revolution of the lower end surfaces of magnets 45 and 46 is above the plane of revolution of the upper end surface of magnet 44 and spaced therefrom by the wall 42 interposed between the driver and follower magnets, the thickness of the wall (and hence the distance between the driver and follower magnets) being selected to permit effective magnetic coupling through the wall. Thus the driver and follower magnets are spaced axially, i.e. disposed in end-to-end relation and spaced apart along their common axis of revolution. The paths of motion of the driver and follower magnets are shown in FIG. 3 by broken lines 55 and 56, respectively.

The polarized lower end faces of magnets 45 and 46, i.e. the faces directed toward the wall 42 and magnet 44, are opposite to each other in polarity. Thus the lower end of one of these magnets (magnet 45 in FIG. 3) is opposite in polarity to the upper end face of magnet 44, and is attracted thereto, while the lower end of the other follower (magnet 46 in FIG. 3) is of the same polarity as the upper face of magnet 44 and is repelled by magnet 44. When the piston 16 and magnet 44 are stationary, the attraction between magnets 44 and 45 causes the arm 51 to assume a position in which the attracted follower magnet is directly above and aligned with magnet 44.

In operation, as the piston 16 undergoes cyclical motion incident to flow of water through the chamber 12 and moves the magnet 44 about its annular path, magnetic forces acting between the driver magnet 44 and the follower magnets transmit this annular motion to the followers. That is to say, magnet 44 drags the followers along their annular path, effecting rotation of arm 51 and shaft 52 and thereby driving the counter device of indicator 28 to count and register the successive cycles of piston displacement.

As the piston 16 accelerates during such operation, the driver magnet 44 drags the attracted follower magnet 45 and thus imparts acceleration to arm 51, but may tend to lead or move ahead of follower 45. However, if magnet 44 becomes displaced by as much as 90° from alignment with magnet 45 in their respective annular paths, it enters the repelling field of the other follower (magnet 46) and pushes magnet 46 ahead by magnetic repulsion; in this way magnet 44 continues to impart acceleration to arm 51 and there is no slippage or loss of coupling between the first and follower magnets.

Similarly, upon deceleration of piston 16, magnet 44 may lag the attracted follower magnet 45 through tending to retard rotation of arm 51 by attractive coupling to the latter magnet; but if it lags the attracted follower 45 by as much as 90° it enters the field of the repelled follower magnet 46 and, by repulsive coupling to this magnet 46, continues to retard the rotation of the arm so that again there is no slippage.

The two follower magnets 45 and 46 are preferably substantially equal to each other in mass. In such case, since they are equidistant from the axis of rotation of arm 51 and revolve 180° apart, the centrifugal force exerted on the follower magnet mounting assembly by revolution of magnet 45 is balanced and cancelled out by the equal and opposite centrifugal force exerted by revolution of magnet 46, with the result that no net centrifugal force is exerted on the mounting assembly. Also, it is preferred that magnets 45 and 46 be substantially smaller than the driver magnet 44; thus, in the form shown, the diameter of disc magnet 44 (and hence the area of its polarized disc face) is substantially larger than that of magnets 45 and 46. Whereas relatively large size of the latter magnet is desirable for good coupling strength, small size of the follower magnets reduces inertial forces as well as thrust and bearing loads on the follower magnet mounting assembly. That is to say, this relative proportioning of the driver and follower magnets enables attainment of strong coupling with low follower arm inertia—both factors contributing to avoidance of slippage. In some instances, employing a driver magnet substantially larger than the follower magnets, adequate avoidance of slippage may be obtained with the two followers having like (attracting or repelling) poles directed downwardly, or even with one of the followers omitted; in the latter case, it is preferable (for minimization of slippage) that the downwardly-directed end of the single remaining follower magnet and the upper end of the driver magnet be alike in polarity so that the magnets are coupled by repulsive forces. Such a structure would be presented in FIGS. 1–3 if follower magnet 45 were omitted, leaving magnet 46 mounted on arm 51 for revolution in the annular path 56.

While the magnets 44, 45 and 46 are shown as solid discs in FIGS. 1–3, other forms of axially polarized permanent magnets may be employed; for example, the driver magnet 44 may be hollow.

Stated generally, the size (i.e. strength) of the magnets employed in the present coupling device should be sufficient to prevent the driver magnet from "pulling out," or in other words, from becoming displaced with respect to the follower magnets by as much as a complete cycle of revolution, during piston acceleration or deceleration. If pull-out occurs, coupling between the driver and follower magnets is lost. Accordingly, the magnet size should be selected, with reference to the torque required to transmit acceleration to the particular indicator mechanism employed, so as to assure that any acceleration encountered will be transmitted without pullout, and should therefore be greater when the torque requirement of the indicator is relatively large than when an indicator requiring less torque is used.

Although the driver and follower magnet path radii are made substantially equal in the device of FIGS. 1–3, the follower magnet path radius may alternatively (and indeed preferably) be somewhat shorter than the driver magnet path radius, as illustrated in FIGS. 4 and 5, which show a structure identical to that of FIGS. 1–3 except that the arm 51 carrying the follower magnets 45 and 46 is replaced by a shorter arm 51a. Such reduction in radius of the follower magnet path decreases the inertia of the follower assembly that must be overcome in transmitting change of velocity from the driver magnet to the follower magnets. In addition, provision of a follower magnet path radius smaller than the driver magnet path radius enhances the effective coupling strength between the driver and follower magnets when the driver magnet is displaced out of alignment with the follower magnets during piston acceleration or deceleration.

Specifically, whenever the driver magnet is displaced from the nearest adjacent follower magnet in their respective paths by any given angle, the distance between the driver and follower magnets will be shorter, if the ratio of driver path radius to follower path radius is within a given range of values smaller than unity (determined by such given angle), than if the radii are equal. This reduction in distance increases the magnetic force acting between the magnets. Furthermore, the component of that force acting on the follower magnet in a direction tangential to the follower path (which is the component of force effective to produce change in follower magnet velocity) is a larger proportion of the total magnetic force when the ratio of the two path radii is within the aforementioned range of values, than it is when the radii are equal.

The follower magnet path radius is therefore desirably selected so that the ratio of the follower path radius to the driver magnet path radius will lie within a range of values affording reduction in distance between the magnets (as compared with the distance between magnets when the two path radii are equal) at some particular angle of displacement, such angle being dependent on the torque required to drive the indicator mechanism employed. By way of illustration, in one specific example of suitable arrangement of a magnetic coupling in accordance with the invention, in a cylindrical piston-type water meter, the follower magnet path radius was 0.32 inch and the driver magnet path radius was 0.39 inch, the value 32/39 corresponding substantially to the optimum value for the ratio of follower to driver path radius in that device. The lower limit of the ratio of follower path radius to driver path radius in the same example was about 26/40; i.e. a coupling device having a follower path radius of magnitude such that the ratio of follower to driver path radius lay between 26/40 and 1 afforded superior coupling for transmission of change in piston velocity to the indicator mechanism, as compared with a coupling device having a follower path radius equal to the driver path radius. A preferred range of values for the ratio of follower to driver path radius, for various conventional meter structures and indicator mechanisms, is about 0.65 to about 0.90.

An alternative water meter structure incorporating a magnetic coupling device in accordance with the present invention is shown in FIGS. 4 and 5. The meter 60 shown in FIG. 4 is a generally conventional positive displacement water meter of the nutating disc type, comprising, with a housing 61, a meter chamber 62 containing a disc piston 64. The piston 64 and chamber 62 are arranged, in conventional manner, so that flow of water through the meter chamber (entering through inlet 65 and leaving through outlet 66) produces a regular nutating motion of the disc. A spindle 68, carried by the disc piston 64, projects upwardly therefrom along the geometric axis of the piston and itno a recess 70 formed in the top of the housing 61. As the piston 64 nutates, the upper end of spindle 68 moves along an axially vertical annular path in recess 70 (being guided in such motion by a downwardly tapering frusto-conical projection 71 fixedly disposed in the center of recess 70, as particularly shown in FIG. 5) at a rate of one complete cycle of revolution for each given unit quantity of water passing through the meter. As in the meter of FIGS. 1–3, an indicator mechanism 28 (which again may be wholly conventional), mounted within a housing 73 secured to the exterior of the meter housing 61 above chamber 62, counts and registers these revolutions. The top wall portion 74 of the meter housing above recess 70 and the floor 75 of indicator housing 73 are formed of nonmagnetic material as defined above, and are disposed in closely proximate relation to constitute a completely sealed wall separating the meter chamber from the indicator mechanism and extending in a plane parallel to the plane of revolution of the upper extremity of spindle 68.

Motion of the spindle 68 is transmitted to the indicator through this wall by means of a magnetic coupling device embodying the invention and generally similar to that shown in FIGS. 1–3. An elongated and end-polarized permanent bar magnet 78 is mounted in the upper portion of spindle 68, with its magnetic axis aligned with the geometric axis of the disc piston 64, to constitute the driver magnet of the coupling. As shown, one polarized end of this magnet faces away from the piston and toward the wall portion 74 so as to move with the upper end of spindle 68 in the recess 70, along an axially vertical annular path in a plane of revolution parallel to wall portion 74.

The follower assembly comprising oppositely polarized follower magnets 45 and 46 carried at the extremities of arm 51 on rotatable pinion shaft 52 (which is connected to drive the counter of indicator mechanism 28) may be identical in structure and arrangement to the corresponding elements of the coupling of FIGS. 1–3. This follower assembly is mounted externally of wall 74, within the indicator housing 73, in such position that the lower end faces of follower magnets 45 and 46 are directed toward wall 74 and move along an annular path coaxial with, and substantially equal in radius to (or smaller in radius than), the annular path of the driver magnet 78. Piston motion is transmitted to the indicator mechanism by magnetic coupling through wall 74 between the driver and follower magnets effecting rotation of arm 51 upon cyclical motion of the piston, all in the manner described above in connection with the structure of FIGS. 1–3. The considerations discussed above pertaining to magnet size or strength and relative dimensions of follower and driver magnet path radii in the embodiments of FIGS. 1–5 are applicable also to the structure of FIGS. 6–7.

It is to be understood that the invention is not limited to the features and embodiments hereinabove specifically set forth, but may be carried out in other ways without departure from its spirit.

I claim:

1. In combination with a driven member and a driving member disposed and adapted for guided displacement effecting movement of a portion of said driving member along an annular path, mechanism for transmitting motion of said driving member to said driven member, said mechanism comprising:

(a) a driver magnet engaged by said portion of said driving member for movement therewith along said annular path, said driver magnet being disposed in eccentric relation to the axis of said annular path with one polarized end facing away from said driving member for movement in a given plane of revolution;

(b) a pair of follower magnets; and (c) rotatable means connected to operate said driven member and supporting said pair of follower magnets for movement in an annular path coaxial with said first-mentioned annular path, said pair of follower magnets being carried by said rotatable means in fixed relation to each other at positions 180° apart in said second-mentioned annular path with one polarized end of each of said follower magnets disposed in facing spaced relation to said plane of revolution of said driver magnet, the distance between said last-mentioned ends of said follower magnets and said plane of revolution being selected to afford magnetic coupling between said driver magnet and said follower magnets for effecting movement of said follower magnets in response to driver magnet motion, and the ends of said follower magnets facing said plane of revolution being opposite to each other in polarity.

2. Mechanism as defined in claim 1, wherein said follower magnets are substantially identical to each other in mass.

3. Mechanism as defined in claim 2, wherein said follower magnets are substantially smaller than said driver magnet.

4. Mechanism as defined in claim 3, wherein each of said magnets is a flat disc having polarized disc faces.

5. Mechanism as defined in claim 4, wherein said one polarized end of said driver magnet has a planar surface transverse to the magnetic axis of said driver magnet and lying in said plane of revolution, and wherein the ends of said follower magnets facing said plane of revolution have planar surfaces transverse to the magnetic axes of said follower magnets and lying in a common plane parallel to said plane of revolution.

6. Mechanism as defined in claim 1, wherein the radius of the second-mentioned annular path is not substantially greater than the radius of the first-mentioned annular path.

7. Mechanism as defined in claim 6, wherein the radius of the second-mentioned annular path is shorter than the radius of the first-mentioned annular path.

8. Mechanism as defined in claim 7, wherein the ratio of the radius of the second-mentioned annular path to the radius of the first-mentioned annular path is between about 0.65 and about 0.90.

9. In a positive displacement meter, in combination with a meter chamber through which fluid to be metered flows and which has a wall of nonmagnetic material, a metering element disposed within said chamber for guided cyclical displacement effecting eccentric movement of a portion of said element along an annular path in a plane substantially parallel to said wall in response to fluid flow, said portion being located on the geometric axis of said element, and means disposed externally of said wall for indicating displacement of said element, mechanism for transmitting motion of said element to said indicating means to operate said indicating means, said mechanism comprising:

(a) a driver magnet engaged by said portion of said element for movement therewith along said annular path, said driver magnet being disposed in eccentric relation to the axis of said annular path with one polarized end facing toward said wall;

(b) a pair of follower magnets; and (c) rotatable means connected to operate said indicating means and supporting said pair of follower magnets for movement in an annular path external to said wall and coaxial with said first-mentioned annular path, said pair of follower magnets being carried by said rotatable means in fixed relation to each other at positions 180° apart in said second-mentioned annular path with one polarized end of each of said follower magnets facing said wall, the distance between said last-mentioned ends of said follower magnets and the plane of revolution of said driver magnet end being selected to afford magnetic coupling between said driver magnet and said follower magnets for effecting movement of said follower magnets in response to driver magnet motion.

10. Mechanism as defined in claim 9, wherein the radius of the second-mentioned annular path is not substantially greater than the radius of the first-mentioned annular path.

11. Mechanism as defined in claim 10, wherein said follower magnets are substantially equal to each other in mass, and wherein the ends of said follower magnets facing said wall are opposite to each other in polarity.

12. Mechanism as defined in claim 11, wherein said follower magnets are substantially equal to each other in mass and substantially smaller than said driver magnet.

13. Mechanism as defined in claim 10, wherein said metering element is radially symmetrical and wherein said driver magnet is so disposed that its magnetic axis is substantially coincident with the axis of symmetry of said element.

14. Mechanism as defined in claim 13, wherein said chamber is cylindrical and said element is a cylindrical piston disposed for cyclical displacement within said chamber is maintained in axially parallel relation thereto.

15. Mechanism as defined in claim 13, wherein said chamber and element are mutually adapted for nutating displacement of said element within said chamber.

16. Mechanism as defined in claim 13, wherein the first-mentioned and second-mentioned annular parts are substantially equal in radius.

17. Mechanism as defined in claim 13, wherein the radius of the second-mentioned annular path is shorter than the radius of the first-mentioned annular path.

References Cited

UNITED STATES PATENTS

| | | | |
|---|---|---|---|
| 2,399,856 | 5/1946 | Coger | 310—104 X |
| 2,921,468 | 1/1960 | Treff et al. | 310—104 X |
| 3,163,041 | 12/1964 | Karlby et al. | 310—104 X |
| 3,240,426 | 3/1966 | Newbury et al. | 73—257 X |
| 3,295,370 | 1/1967 | Marx | 310—104 X |
| 3,353,045 | 11/1967 | Bassett | 73—258 X |

FOREIGN PATENTS 594,330  7/1929  Germany.

JAMES J. GILL, *Primary Examiner.*

E. D. GILHOOLY, *Assistant Examiner.*

U.S. Cl. X.R.

73—258, 272; 310—104